United States Patent [19]

Najjar et al.

[11] Patent Number: 5,181,941
[45] Date of Patent: Jan. 26, 1993

[54] MEMBRANE AND SEPARATION PROCESS

[75] Inventors: Mitri S. Najjar, Wappingers Falls, N.Y.; Carl A. Hultman, Waterford, Pa.

[73] Assignee: Texaco Inc., White Plains, N.Y.

[21] Appl. No.: 807,489

[22] Filed: Dec. 16, 1991

[51] Int. Cl.⁵ ............... B01D 53/22; B01D 69/04; B01D 71/02

[52] U.S. Cl. ............... 55/16; 55/68; 55/158; 55/524; 55/DIG. 5; 204/181.7; 205/231

[58] Field of Search ............. 55/16, 158, 524, 68, 55/DIG. 5; 204/181.7; 205/230–232

[56] References Cited

U.S. PATENT DOCUMENTS

| | | | |
|---|---|---|---|
| 3,024,175 | 3/1962 | Cook | 205/231 X |
| 3,226,309 | 12/1965 | Oxley | 205/232 |
| 3,547,789 | 12/1970 | Andrews et al. | 205/232 X |
| 4,483,752 | 11/1984 | Kline | 205/230 X |
| 4,528,003 | 7/1985 | Dittrich et al. | 55/16 X |
| 4,589,891 | 5/1986 | Iniotakis et al. | 55/158 |
| 4,804,475 | 2/1989 | Sirinyan et al. | 55/16 X |

FOREIGN PATENT DOCUMENTS

| | | | |
|---|---|---|---|
| 0081669 | 6/1983 | European Pat. Off. | 55/158 |
| 2823521 | 12/1979 | Fed. Rep. of Germany | 55/16 |
| 53-043153 | 11/1978 | Japan | 55/158 |
| 59-055315 | 3/1984 | Japan | 55/158 |
| 60-044020 | 3/1985 | Japan | 55/158 |
| 61-138516 | 6/1986 | Japan | 55/158 |
| 62-027005 | 2/1987 | Japan | 55/158 |
| 62-121616 | 6/1987 | Japan | 55/158 |
| 63-294925 | 12/1988 | Japan | 55/158 |

*Primary Examiner*—Robert Spitzer
*Attorney, Agent, or Firm*—Robert A. Kulason; James J. O'Loughlin; Carl G. Seutter

[57] ABSTRACT

A novel membrane system, including a layer of platinum or palladium on graphite, is used to separate hydrogen from a hydrocarbon stream.

20 Claims, No Drawings

MEMBRANE AND SEPARATION PROCESS

RELATED APPLICATION

Application Ser. No. 07/726,434, filed Jul. 5, 1991 of Texaco Inc as assignee of Mitri S. Najjar, Tansukhlal G. Dorawala, and Uygur Kokturk.

FIELD OF THE INVENTION

This invention relates to a method of preparing a novel membrane. More particularly it relates to method of preparing a membrane system which may be used to separate gases.

BACKGROUND OF THE INVENTION

As is well known to those skilled in the art, it may be desirable or necessary to separate various components from the streams which they are found in commercial operations. In the field of gas technology for example, it may be desirable to effect a separation between hydrogen and hydrocarbon gases in order to obtain one or the other, or both, in enriched or purified state. Prior art techniques to effect this separation include distillation—but distillation is characterized by high initial capital costs and substantial operating costs.

It is an object of this invention to provide a novel membrane system particularly characterized by its ability to separate gas streams into their components. Other objects will be apparent to those skilled in the art from the following.

STATEMENT OF THE INVENTION

In accordance with certain of its aspects, this invention is directed to the method of preparing a membrane suitable for use in separating a mixture of more permeable gas and less permeable gas which comprises maintaining, in a graphite container, at 500° C.–1300° C. a molten salt bath containing a halide of an alkali metal or an alkaline earth metal and a source of Group VIII noble metal;

maintaining in said molten salt bath (i) an anode, submerged beneath the surface of said bath, and (ii) a porous graphite cathode;

passing a direct current through said cathode, said bath, and said anode at cathode current density of 0.1–4 asd thereby depositing on said cathode a thin, dense membrane layer of Group VIII noble metal; and recovering said cathode bearing a thin, dense membrane layer of Group VIII noble metal.

DESCRIPTION OF THE INVENTION

In accordance with practice of this invention, the membrane of this invention may be formed on a porous graphite body or support. The configuration or shape of the porous graphite body will depend on the form of the structure in which the membrane assembly is to be used. Although it is possible to utilize a porous graphite body in the form of a flat sheet, it is found to be more desirable to utilize a tubular configuration. The inside diameter of the tubular body may typically be 3–50 mm, say 7 mm. The outside diameter is typically 5–52 mm, say 9 mm. It is found to be convenient to utilize tubular members having a length of 25 cm–200 cm, say 120 cm.

The porosity of these porous graphite tubular bodies may be 30–70%, say 50%, as determined by mercury porosimetry techniques.

Preparation of the membrane system of this invention may be effected by electrodeposition onto the porous graphite body support from a molten salt bath. The bath may be formed of any salt having a melting point of 500° C.–1300° C. (but not higher than the melting point of the Group VIII noble metal or alloy thereof to be deposited). The preferred components of the bath include salts of alkali metals.

Alkali metals which may be employed may include sodium, potassium, rubidium, cesium, or lithium. These metals may be employed as the halide e.g. fluoride, chloride, bromide, or iodide. It is preferred to utilize alkali metals as their fluorides; and the preferred alkali metal halide may be lithium fluoride or sodium fluoride. It is more preferred to employ a mixture of halides typified by the eutectic composition of 61 mole % lithium fluoride and 39 mole % sodium fluoride. This eutectic has a melting point of 649° C. at atmospheric pressure.

Alternatively the molten salt bath may contain an alkaline earth metal halide. The alkaline earth metals which may be employed may include calcium, barium, strontium, or magnesium. Preferred component is calcium fluoride. It may be possible to employ alkaline earth halides as mixtures thereof or with the alkali metal halides.

Preferably the mixture of salts will be such that the melting point of the mixture is within the preferred operating range of 500° C.–1300° C., say 600° C.–800° C., preferably 649° C. Illustrative mixtures which may be employed may include the following:

TABLE

|   | Components | Mole % | Mixture Melting Point °C. |
|---|---|---|---|
| A | LiF | 61 | 649 |
|   | NaF | 39 | |
| B | LiF | 52 | 510 |
|   | KF | 48 | |
| C | CaCl$_2$ | 60 | 597 |
|   | BaCl$_2$ | 40 | |
| D | KF | 80 | 780 |
|   | CaF$_2$ | 20 | |
| E | LiF | 50 | 621 |
|   | BaF$_2$ | 35 | |
|   | NaF | 15 | |

The preferred bath composition is the first listed in the above Table.

Although it is possible to operate using an insoluble anode such as carbon (in which case the source of the Group VIII noble metal may be a bath soluble salt, preferably a halide, of Group VIII noble metal such as platinum or palladium), it is preferable to utilize a insoluble anode of the Group VIII noble metal, preferably platinum or palladium.

It has been found that when the insoluble anode of e.g. palladium is employed, it should be totally immersed within the plating bath of molten salts. If it is not totally immersed, it is unexpectedly found that the palladium anode fractures at the level of the upper face of the bath. This is believed to be due to the reaction of the palladium metal with those graphite particles which have migrated to the surface of the anode where they interact with the salt and the palladium.

This fracturing of the palladium anode is avoided by employing a graphite holder for the metal anode—the graphite holder being secured to the metal at a point beneath the surface of the bath. In this manner, there is no contact between the metal anode and the surface of the bath; and fracture of the former is essentially eliminated.

When it is desired to deposit an alloy, at least one (and preferably both) of the alloy components may be present in the bath as soluble salts. Typical of such salts may be:

TABLE
| |
|---|
| PtF$_2$ |
| PtF$_4$ |
| PtCl$_2$ |
| PtCl$_3$ |
| PdCl$_2$ |

If it be desired to deposit an alloy, the bath may contain salts or other metals typified by Cr, Cu, Ni, Rh, etc—in addition to Pd or Pt. An alloy of Pd-Pt may be deposited.

In practice of the process of the invention, a direct current of electricity is passed through the cathode, the bath, and the anode. Typically the potential across the bath may be 0.1-2.0 volts, preferably 0.2-1.0 volts, say 0.1 volts. The cathode current density may be 0.1-4.0, preferably 0.2-1.0, say 0.3 amperes per square decimeter (asd). Electrodeposition for 0.05-120 minutes, typically 10-30 minutes may yield an electrodeposit of palladium which has a thickness of 0.05-200 microns, preferably 0.2-50 microns, say 15 microns.

It is a feature of the process of this invention that electrodeposition be carried out in a graphite container. It is found that graphite containers are peculiarly inert to bath conditions. In contrast, it is found that if a container of nickel metal be employed, palladium is undesirably deposited on the walls of the nickel container unless the walls of the latter has been passivated—which is an undesirably uneconomical process.

In the preferred embodiment of this invention, electrodeposition is carried out in the presence of an inert gas typified by nitrogen (?) or the inert gases of group O of the Periodic Table. It is preferred to use argon.

Preferably the argon is admitted by bubbling beneath the surface of the molten salt bath. In the preferred embodiment, the argon is admitted beneath the surface of the bath through a graphite conduit.

It is also found that the graphite cathode should be immersed within the molten salt bath for 10-30 minutes, say 10 minutes prior to the start of electro-deposition. It appears that this step may drive occluded gases from the cathode and permit attainment of a more satisfactory electrodeposit.

Although it may be possible to electrodeposit the thin, dense layer of Group VIII noble metal, preferably palladium or platinum on the outside of the preferred tubular graphite cathode, it is preferred to electrodeposit the thin dense layer onto the inside surface. This may be carried out using a metal wire anode within the tubular cathode—as this will minimize problems arising from inadequate throwing power of the bath which might be observed if the anode were located outside the tubular cathode. In the case of a flat cathode, as in the case of the tubular cathode, it may be possible to effect electrodeposition on both sides of the cathode—but this is not necessary when the system is to be used as a separation membrane.

The electrodeposited layer, after cooling to ambient temperature of 20° C.-80° C. 40° C. is preferably contacted with water or molten chloride salt (e.g. sodium chloride) solution to dissolve therefrom any salts carried over from the bath.

It is a feature of the process of this invention that the thin electrodeposit of Group VIII noble metal, preferably of platinum or palladium (or alloy thereof) is dense and non-porous.

Typically the plated tubular product may be a tube of a porous graphite body of 5-25 mm, say 9 mm outside diameter, 3-20 mm, say 7 mm inside diameter and 25-200 cm, say 150 cm in length bearing on the inside surface a 0.05-10 micron, say 0.2 micron thin, dense platinum or palladium layer having a thickness of 0.2-50 microns, say 15 microns.

It will be found that the deposited metal diffuses into the porous substrate to form an alloy or solid solution therewith; and it becomes an integral part thereof rather than being only mechanically attached to the surface as may be the case with many electrodeposits. Observation reveals a sub-surface layer of carbon-metal on which may be found a layer of metal.

It is a feature of the process of this invention that there may be electrodeposited on top of the thin dense membrane layer of the Group VIII noble metal, preferably platinum or palladium, a layer of a platinum or a palladium alloy. The alloy may be e.g. palladium and a metal of Group I B (e.g. Cu, Ag, Au), II B (Zn or Cd preferably), IVA, (Sn preferably), VI B (Cr, Mo, W), or VIII (Fe, Co, Ni, Ru, Rh, Os, Ir, or Pt).

Illustrative of such alloys of palladium may be those containing the following metals in the indicated percentages: 2-50 w % Cr, 30-45 w % Cu, 3-15 w % Ni, 5-20 w % Rh, 5-15 w % Ru, 4-30 w % Pt, 2-65 w % Ag, 1-20 w % Sn etc. These alloys may be deposited onto the first deposit from a bath at conditions similar to those employed in the first electrodeposition operation.

In accordance with certain of its aspects, this invention is directed to a method of separating hydrogen from a charge gaseous mixture containing hydrogen and a gaseous hydrocarbon which comprises passing a charge gaseous mixture containing hydrogen and a gaseous hydrocarbon into contact with a thin, dense separating membrane layer containing Group VIII noble metal on a porous graphite body;

maintaining a pressure drop across said thin, dense separating membrane layer containing Group VIII noble metal on a porous graphite body thereby forming a retentate containing a decreased content of hydrogen and a permeate containing an increased content of hydrogen;

recovering said retentate containing a decreased content of hydrogen from the high pressure side of said thin, dense separating membrane layer containing Group VIII noble metal on a porous graphite body; and recovering said permeate containing an increased content of hydrogen from the low pressure side of said thin dense separating membrane layer containing Group VIII noble metal on a porous graphite body.

In practice of the process of this invention, the charge stream may be a gaseous mixture containing hydrogen and a gaseous hydrocarbon. Typically the hydrocarbon may be a $C_1$-$C_4$ hydrocarbon—methane, ethane, n-propane, n-butane, or iso-butane. Commonly the charge may contain 20-80, say 78 v % hydrogen and 20-80 say 22 v % hydrocarbon. Typical charge mixtures may be as follows:

TABLE

| | V % | |
|---|---|---|
| Component | Broad | Typical |
| Hydrogen | 20-70 | 78 |
| Methane | 5-20 | 10 |
| Ethane | 4-15 | 7 |

TABLE-continued

| Component | V % Broad | V % Typical |
|---|---|---|
| Propane | 1-5 | 2 |
| Butane | 1-5 | 2 |
| i-butane | 0-4 | 1 |

Other hydrocarbons may also be present—typified by olefins, aromatics, naphthenes, etc.

The charge gas may be a stream from a dehydrogenation (or a hydrogenation) unit wherein it is desired to recover products or to shift the equilibrium during dehydrogenation or hydrogenation.

The charge hydrocarbon typically at 200°-600° C., say 447° C. and 200-1500 psi, say 1000 psig is passed into contact with the thin, dense separating membrane layer which preferably has been deposited on the inside of a porous graphite tubular conduit. Preferably the charge passes through the conduit at a flow rate of between 300-900 cm$^3$/min per square cm of surface, say 550 cm$^3$/min per square cm of surface.

As the charge passes through the tubular conduit, a portion of the charge diffuses through the metal layer and the graphite conduit. The permeate is found to contain an increased content of hydrogen—and the retentate contains a decreased content of hydrogen. Typically it may be possible to treat a charge containing 20-90 v %, say 78 v % hydrogen (plus hydrocarbon) and to attain a permeate containing 90-100 v %, say 99.9 v % hydrogen. The retentate within the tubular member may typically contain 20-30 v %, say 25 v % hydrogen.

In practice of the invention, a plurality of tubes may be preferably formed in a heat-exchanger-like structure, and the charge is admitted to and passes through the tube side from which the retentate is also withdrawn. The hydrogen-enriched permeate is withdrawn through the shell side. It will be apparent to those skilled in the art that greater degrees of concentration (e.g. purity of hydrogen) may be attained by passing the permeate through additional stages.

DESCRIPTION OF SPECIFIC EMBODIMENTS

Practice of the process of this invention will be apparent to those skilled in the art from the following wherein as elsewhere in this specification, all parts are parts by weight unless otherwise stated.

EXAMPLE I

In this Example which represents the best mode presently known of preparing the separating membrane, there is prepared, in a graphite container, a bath containing:

| Component | w % |
|---|---|
| lithium fluoride | 61 |
| sodium fluoride | 39 |

The mixture of lithium fluoride and sodium fluoride is the eutectic mixture melting at about 649° C.

The bath is heated to 820°±20° C. and there is submerged therein a tubular cathode (i.d. 7 mm, o.d. 9 mm, and 150 cm in length) of porous graphite. The cathode is mounted on a cathode holder of graphite so that in operation, the entire cathode is submerged within the bath. The cathode is allowed to remain in the bath for 15 minutes prior to electroplating. A palladium anode wire is mounted within the tubular cathode; and voltage of 440±40 millivolts is applied between the cathode and the bath and the anode, at a cathode current density of 0.1 amps per square decimeter. During electrodeposition, argon is bubbled into the bath through a carbon conduit.

After 10 minutes, there is deposited on the inside of the tubular cathode a thin, dense layer of palladium, of thickness of 15 microns on an interface of palladium—carbon of thickness of 0.05 microns.

EXAMPLE II

In this Example which represents the best mode presently known of separating hydrogen by practice of the process of this invention, the charge is:

TABLE

| Component | Vol % |
|---|---|
| Hydrogen | 78 |
| Methane | 22 |

This charge at 447° C. and 1000 psig is admitted to the tube side of an heat-exchanger-like structure containing 19 tubes prepared in accordance with Example I. The total membrane area is 0.11 m$^2$.

After steady state is reached, it may be found that the permeate is as follows:

TABLE

| Component | V % |
|---|---|
| Hydrogen | 100% |
| Methane | 0% |

The retentate may be characterized as follows:

TABLE

| Component | V % |
|---|---|
| Hydrogen | 25% |
| Methane | 75% |

The selectivity is found to be 100% and the permeability is 5.8×10$^3$ cm$^3$/cm$^2$ sec.

EXAMPLES III-VI

Results comparable to those of Example I may be attained if the metal layer is:

| Example | Metal Layer |
|---|---|
| III | Pd—Pt |
| IV | Pd—Cr |
| V | Pd—Cu |
| VI | Ir |

EXAMPLE VII*

In a Control Example, the procedure of Example I is duplicated except that the palladium anode is not mounted in a graphite holder; and it is mounted so that a portion projects above the surface of the bath. At the end of the run, it is found that the palladium has become embrittled and cracked at the point at which it meets the liquid salt bath.

Although this invention has been illustrated by reference to specific embodiments, it will be apparent to those skilled in the art that various charges and modifications may be made which clearly fall within the scope of the invention.

What is claimed:

1. The method of separating a less permeable gas from a charge gaseous mixture containing a more permeable gas and a less permeable gas which comprises passing a charge gaseous mixture containing more permeable and a less permeable gas into contact with a thin, dense separating membrane layer containing Group VIII noble metal on a porous graphite body;

maintaining a pressure drop across said thin, dense separating membrane layer containing Group VIII noble metal on a porous graphite body thereby forming a retentate containing a decreased content of said more permeable gas and a permeate containing an increased content of said less permeable gas;

recovering said retentate containing a decreased content of said more permeable gas from the high pressure side of said thin, dense separating membrane layer containing Group VIII noble metal on a porous graphite body; and recovering said permeate containing an increased content of said more permeable gas from the low pressure side of said thin dense separating membrane layer containing Group VIII noble metal on a porous graphite body.

2. The method of separating hydrogen from a charge gaseous mixture containing hydrogen and a gaseous hydrocarbon which comprises passing a charge gaseous mixture containing hydrogen and a gaseous hydrocarbon into contact with a thin, dense separating membrane layer containing Group VIII noble metal on a porous graphite body;

maintaining a pressure drop across said thin, dense separating membrane layer containing Group VIII noble metal on a porous graphite body thereby forming a retentate containing a decreased content of hydrogen and a permeate containing an increased content of hydrogen;

recovering said retentate containing a decreased content of hydrogen from the high pressure side of said thin, dense separating membrane layer containing Group VIII noble metal on a porous graphite body; and recovering said permeate containing an increased content of hydrogen from the low pressure side of said thin dense separating membrane layer containing Group VIII noble metal on a porous graphite body.

3. A membrane, suitable for use in separating a mixture of more permeable gas and less permeable gas, prepared by the process which comprises maintaining, in a graphite container, at 500° C.–1300° C. a molten salt bath containing at least one halide of an alkali metal or an alkaline earth metal and a source of Group VIII noble metal;

maintaining in said molten salt bath (i) an anode, submerged beneath the surface of said bath, and (ii) a porous graphite cathode;

passing a direct current through said cathode, said bath, and said anode at cathode current density of 0.1–4 asd thereby depositing on said cathode a thin, dense membrane layer of Group VIII noble metal; and recovering said cathode bearing a thin, dense membrane layer of Group VIII noble metal.

4. The method of preparing a membrane suitable for use in separating a mixture of more permeable gas and less permeable gas which comprises maintaining, in a graphite container, at 500° C.–1300° C. a molten salt bath containing at least one halide of an alkali metal or an alkaline earth metal and a source of Group VIII noble metal;

maintaining in said molten salt bath (i) an anode, submerged beneath the surface of said bath, and (ii) a porous graphite cathode;

passing a direct current through said cathode, said bath, and said anode at cathode current density of 0.1–4 asd thereby depositing on said cathode a thin, dense membrane layer of Group VIII noble metal; and recovering said cathode bearing a thin, dense membrane layer of Group VIII noble metal.

5. The method of preparing a membrane suitable for use in separating a mixture of more permeable gas and less permeable gas claimed in claim 4 wherein said molten salt bath contains an alkali metal halide.

6. The method of preparing a membrane suitable for use in separating a mixture of more permeable gas and less permeable gas claimed in claim 4 wherein said molten salt bath contains a plurality of alkali metal halides.

7. The method of preparing a membrane suitable for use in separating a mixture of more permeable gas and less permeable gas claimed in claim 4 wherein said molten salt bath contains an alkali metal fluoride.

8. The method of preparing a membrane suitable for use in separating a mixture of more permeable gas and less permeable gas claimed in claim 4 wherein said molten salt bath contains lithium fluoride and sodium fluoride or potassium fluoride.

9. The method of preparing a membrane suitable for use in separating a mixture of more permeable gas and less permeable gas claimed in claim 4 wherein said molten salt bath contains the eutectic of lithium fluoride and sodium fluoride.

10. The method of preparing a membrane suitable for use in separating a mixture of more permeable gas and less permeable gas claimed in claim 4 wherein said molten salt bath contains an alkaline earth metal halide.

11. The method of preparing a membrane suitable for use in separating a mixture of more permeable gas and less permeable gas claimed in claim 4 wherein said Group VIII noble metal is palladium.

12. The method of preparing a membrane suitable for use in separating a mixture of more permeable gas and less permeable gas claimed in claim 4 wherein said molten salt bath contains a bath-soluble halide of platinum or palladium as a source of Group VIII noble metal.

13. The method of preparing a membrane suitable for use in separating a mixture of more permeable gas and less permeable gas of claim 12 further including the step of electrodepositing on top of the thin, dense membrane layer of Group VIII noble metal a layer of platinum or palladium alloy.

14. The method of preparing a membrane suitable for use in separating a mixture of more permeable gas and less permeable gas claimed in claim 4 wherein said anode is a source of Group VIII noble metal.

15. The method of preparing a membrane suitable for use in separating a mixture of more permeable gas and less permeable gas of claim 4 wherein said depositing is carried out in the presence of an inert gas.

16. The method of preparing a membrane suitable for use in separating a mixture of more permeable gas and less permeable gas of claim 4 wherein said depositing is carried out in the presence of inert gas admitted, through a graphite conduit, beneath the surface of said bath.

17. The method of preparing a membrane suitable for use in separating a mixture of more permeable gas and less permeable gas of claim 4 wherein said source of Group VIII noble metal is said anode.

18. The method of preparing a membrane suitable for use in separating a mixture of more permeable gas and less permeable gas of claim 4 wherein said source of Group VIII noble metal is a dissolved salt in said bath.

19. The method of preparing a membrane suitable for use in separating more permeable gas from less permeable gas which comprises

- maintaining, in a graphite container, at 500° C.-1300° C. a molten salt bath containing a halide of an alkali metal or an alkaline earth metal;
- maintaining in said molten salt bath (i) an anode submerged beneath the surface of said bath and (ii) a porous graphite cathode and (iii) palladium fluoride;
- passing a direct current through said cathode, said bath, and said anode at cathode current density of 0.1-4 asd thereby depositing on said cathode a thin, dense membrane layer of palladium; and
- recovering said cathode bearing a thin, dense membrane layer of palladium.

20. The method of preparing a membrane suitable for use in separating a mixture of more permeable gas and less permeable gas which comprises

- maintaining in a graphite container at 600° C.-800° C. a molten salt bath containing a eutectic salt composition of lithium fluoride and sodium fluoride and a source of palladium;
- maintaining in said molten salt bath (i) an anode submerged beneath the surface of said bath and (ii) a porous graphite cathode;
- admitting inert gas through a graphite conduit to a point beneath the surface of said bath;
- passing a direct current through said cathode, said bath, and said anode at cathode current density of 0.1-4 asd thereby depositing on said cathode a thin, dense membrane layer of palladium metal; and
- recovering said cathode bearing a thin, dense membrane layer of palladium metal.

* * * * *